US007688189B2

(12) United States Patent
Kuwabara et al.

(10) Patent No.: US 7,688,189 B2
(45) Date of Patent: Mar. 30, 2010

(54) EMERGENCY REPORTING SYSTEM FOR USE WITH VEHICLE

(75) Inventors: Hiroaki Kuwabara, Obu (JP); Hiroshi Sakai, Okazaki (JP)

(73) Assignee: Denso Corporation, Kariya (JP)

( * ) Notice: Subject to any disclaimer, the term of this patent is extended or adjusted under 35 U.S.C. 154(b) by 263 days.

(21) Appl. No.: 12/069,580

(22) Filed: Feb. 11, 2008

(65) Prior Publication Data

US 2008/0197989 A1 Aug. 21, 2008

(30) Foreign Application Priority Data

Feb. 15, 2007 (JP) ............................. 2007-035017

(51) Int. Cl.
*B60Q 1/00* (2006.01)

(52) U.S. Cl. ....................... 340/436; 340/438; 340/439; 340/428; 340/636.1; 340/903; 340/933

(58) Field of Classification Search ................. 340/436, 340/438, 439, 428, 636.1, 539.1, 825.69, 340/903, 933; 701/1, 45; 455/433, 456; 307/10.1
See application file for complete search history.

(56) References Cited

U.S. PATENT DOCUMENTS 6,661,116 B1 12/2003 Seto
6,674,362 B2 * 1/2004 Yoshioka et al. ............ 340/506
7,304,567 B2 * 12/2007 Canfield ...................... 340/438
2005/0197753 A1 * 9/2005 Miura et al. .................. 701/45

FOREIGN PATENT DOCUMENTS

| | | |
|---|---|---|
| JP | 2000-222659 | 8/2000 |
| JP | 2001-130353 | 5/2001 |
| JP | 2003-002256 | 1/2003 |
| JP | 2007-079950 | 3/2007 |
| WO | WO 01/81120 | 11/2001 |

OTHER PUBLICATIONS

Office Action dated Dec. 17, 2008 issued in the corresponding JP application No. 2007-035017.

* cited by examiner

*Primary Examiner*—Hung T. Nguyen
(74) *Attorney, Agent, or Firm*—Harness, Dickey & Pierce, PLC

(57) ABSTRACT

An emergency reporting system for a vehicle includes a reporting signal verifying device and a power supply switching device. The reporting signal verifying device verifies a reporting signal, and the reporting signal verifying device is adapted to cause the emergency reporting to an outside emergency agency when the reporting signal verifying device has completed the verification. The power supply switching device switches power supply for the emergency reporting from a main power supply of the vehicle to an auxiliary power supply in a case, where the main power supply is disabled to supply power. The power supply switching device is adapted to switch the power supply from the main power supply to the auxiliary power supply in a period between (a) a point when the reporting signal verifying device starts the verification and (b) a point when the reporting signal verifying device completes the verification.

15 Claims, 11 Drawing Sheets

EMERGENCY REPORTING SYSTEM FOR USE WITH VEHICLE

CROSS REFERENCE TO RELATED APPLICATION

This application is based on and incorporates herein by reference Japanese Patent Application No. 2007-35017 filed on Feb. 15, 2007.

BACKGROUND OF THE INVENTION

1. Field of the Invention

The present invention relates to an emergency reporting system for a vehicle. The system reports to an outside emergency agency or the like when a collision or another emergency occurs.

2. Description of the Related Art

A conventional emergency reporting system (for example, JP-A-2000-222659) and a collision sensor or the like are fitted to a vehicle. When the vehicle has a collision, the system detects a reporting signal from the sensor or the like and automatically and urgently reports to an outside emergency agency or the like.

In general, the conventional emergency reporting system needs to include a high-capacitance capacitor or an alternative device in order to ensure an emergency reporting operation during a period between a point of time when a collision occurs to a point of time when the power supply for the system is switched from the main battery to the auxiliary power supply of the system. As a result, the whole system is large in size, heavy, and complicated.

SUMMARY OF THE INVENTION

The present invention is made in view of the above disadvantages. Thus, it is an objective of the present invention to address at least one of the above disadvantages.

To achieve the objective of the present invention, there is provided an emergency reporting system for a vehicle, wherein the vehicle has a main power supply that supplies power for an operation of emergency reporting, the system including reporting signal verifying means and power supply switching means. The reporting signal verifying means verifies a reporting signal that serves as a trigger for starting the emergency reporting, and the reporting signal verifying means is adapted to cause the operation of the emergency reporting to an outside emergency agency when the reporting signal verifying means has completed the verification of the reporting signal. The power supply switching means switches power supply for the emergency reporting from the main power supply to an auxiliary power supply in a case, where the main power supply is disabled to supply power. The power supply switching means is adapted to switch the power supply from the main power supply to the auxiliary power supply in a period between (a) a point when the reporting signal verifying means starts the verification of the reporting signal and (b) a point when the reporting signal verifying means completes the verification.

To achieve the objective of the present invention, there is also provided an emergency reporting system for a vehicle, wherein the vehicle has a main power supply that supplies power for an operation of emergency reporting, the system including reporting signal verifying means and power supply switching means. The reporting signal verifying means verifies a reporting signal that serves as a trigger for starting the emergency reporting, and the reporting signal verifying means is adapted to cause the operation of the emergency reporting to an outside emergency agency when the reporting signal verifying means has completed the verification of the reporting signal. The power supply switching means switches power supply for the emergency reporting from the main power supply to an auxiliary power supply in a case, where the main power supply is disabled to supply power. The power supply switching means switches the power supply from the auxiliary power supply to the main power supply if the verification of the reporting signal is not completed after the switching means has switched the power supply to the auxiliary power supply.

To achieve the objective of the present invention, there is also provided an emergency reporting system for a vehicle, the system including reporting signal output means, reporting signal verifying means, reporting means, a main power supply, an auxiliary power supply, power supply switching means, and a capacitor. The reporting signal output means outputs a reporting signal that serves as a trigger for starting emergency reporting. The reporting signal verifying means verifies the outputted reporting signal. The reporting means performs the emergency reporting to an outside emergency agency when the reporting signal verifying means has completed the verification of the reporting signal. The main power supply is configured to supply power for an operation of the emergency reporting. The auxiliary power supply is configured to supply power for the operation of the emergency reporting in a case where the main power supply is disabled to supply power. The power supply switching means switches the power supply from the main power supply to the auxiliary power supply. The capacitor is configured to supply power for the operation of the emergency reporting until the power supply is switched to the auxiliary power supply in the case where the main power supply is disabled to supply power. The power supply switching means is adapted to switch the power supply from the main power supply to the auxiliary power supply in a period between (a) a point when the reporting signal verifying means starts the verification of the reporting signal and (b) a point when the reporting signal verifying means completes the verification.

To achieve the objective of the present invention, there is also provided an emergency reporting system for a vehicle, the system including reporting signal output means, reporting signal verifying means, reporting means, a main power supply, an auxiliary power supply, power supply switching means, and a capacitor. The reporting signal output means outputs a reporting signal that serves as a trigger for starting emergency reporting. The reporting signal verifying means verifies the outputted reporting signal. The reporting means performs the emergency reporting to an outside emergency agency when the reporting signal verifying means has completed the verification of the reporting signal. The main power supply is configured to supply power for an operation of the emergency reporting. The auxiliary power supply is configured to supply power for the operation of the emergency reporting in a case where the main power supply is disabled to supply power. The power supply switching means switches the power supply from the main power supply to the auxiliary power supply. The capacitor is configured to supply power for the operation of the emergency reporting until the power supply is switched to the auxiliary power supply in the case where the main power supply is disabled to supply power. The power supply switching means switches the power supply from the auxiliary power supply to the main power supply if the verification of the reporting signal is not completed after the switching means has switched the power supply to the auxiliary power supply.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Embodiments of the present invention will be described below with reference to the accompanying drawings.

Embodiment 1

Figure 1:
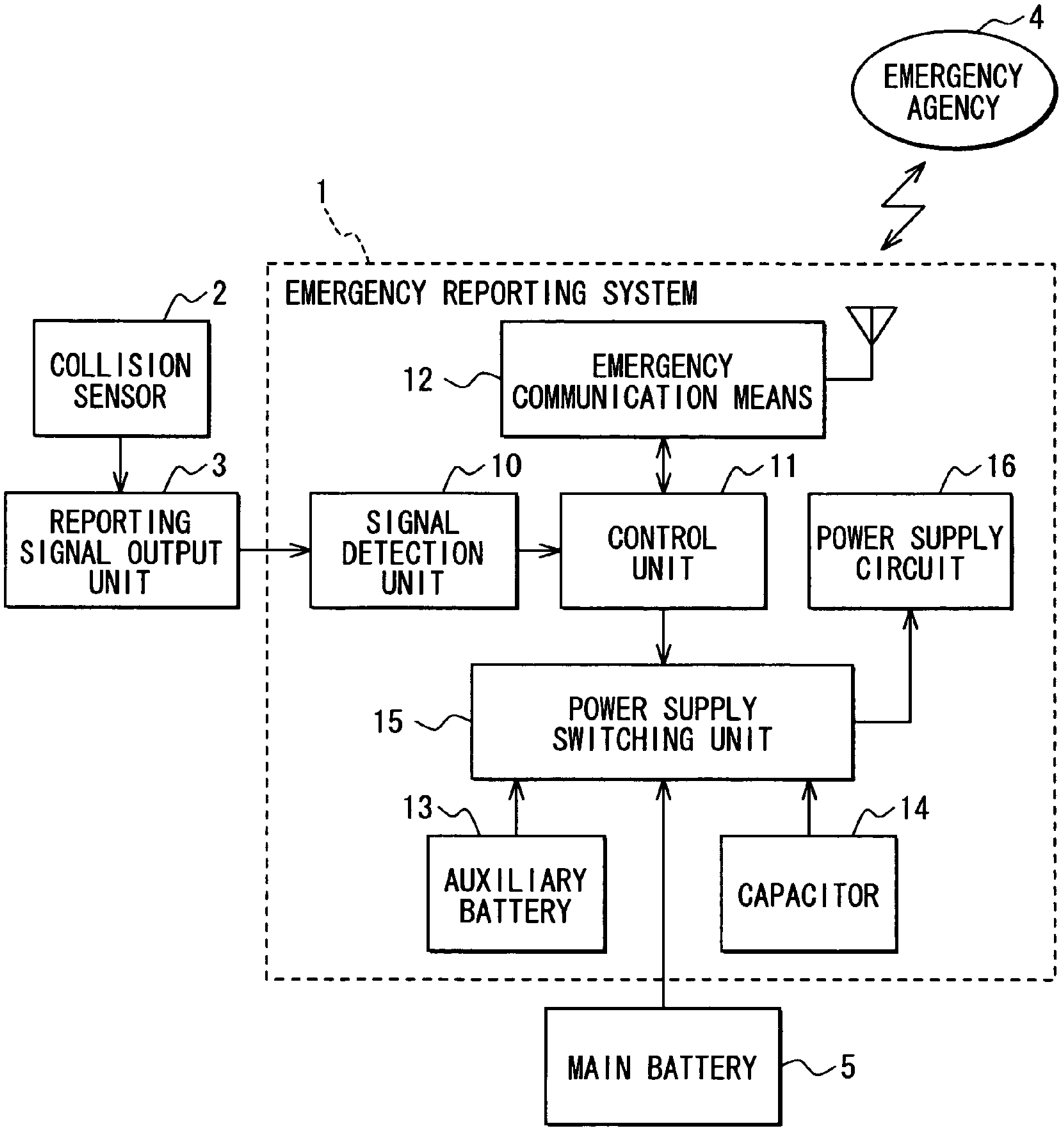
FIG. 1 is a general block diagram of an emergency reporting system for use with a vehicle according to Embodiment 1 of the present invention.

The structure and operation of general emergency reporting systems as represented by the foregoing system will be described below. FIG. 1 schematically shows the structure of an emergency reporting system 1 for use with a vehicle. The reporting system 1, a collision sensor 2, and a reporting signal output unit 3 are fitted to a vehicle, in which a main battery 5 is mounted. The reporting system 1 includes a signal detection unit 10, a control unit 11, an emergency communication means 12, an auxiliary battery 13, a capacitor 14, a power supply switching unit 15, and a power supply circuit 16. In response to a collision of the vehicle, the collision sensor 2 outputs a signal to the output unit 3, which then outputs a reporting signal. The detection unit 10 detects the reporting signal. The control unit 11 verifies the detected signal and instructs the performance of emergency reporting. In response to the instruction, the communication means 12 performs emergency reporting to an emergency agency 4. The auxiliary battery 13 and capacitor 14 ensure operating power for emergency reporting in case the power supply from the main battery 5 fails due to a collision. The switching unit 15 switches the power supply for the operating power. The power supply circuit 16 controls the distribution of the power supplied from the power supply.

Specifically, the reporting signal output unit 3 is an air bag ECU (electronic control unit). In response to the signal from the collision sensor 2, the output unit 3 generates a reporting signal (described later on) as a pulse signal and outputs the signal to the signal detection unit 10. When the collision sensor 2 outputs no signal to the output unit 3, the output unit 3 outputs a pulse signal (normal signal) different from the reporting signal. The output unit 3 controls the inflation of an air bag (not shown).

The signal detection unit 10 is a pulse detection circuit that detects a pulse signal from the air bag ECU. The detection unit 10 detects high-pulse and low-pulse durations etc. of the pulse signal and outputs a signal corresponding to the detection as to the control unit 11. Typically, the high-pulse duration is an interval between the leading edge and the falling edge of the pulse, and the low-pulse duration is an interval between the falling edge and the leading edge of the pulse.

The main component of the control unit 11 is a microcomputer, which has a CPU (central processing unit) connected to memories such as a ROM (read only memory) and a RAM (random access memory). The control unit 11 executes various processes according to the signal from the signal detection unit 10, the programs stored in the ROM, and the data of the reporting signal. For example, the control unit 11 verifies whether the detected pulse signal is a reporting signal, makes the emergency communication means 12 perform emergency reporting, and makes the power supply switching unit 15 switch the power supply.

In response to a request for an emergency reporting operation from the control unit 11, the emergency communication means 12 transmits to the outside emergency agency 4 (an emergency center, a fire station, or the like) the data on the vehicle position that is output from a position sensor (not shown) and other data. At the same time, the communication means 12 enables the oral communication between the agency 4 and the user.

Figure 2:
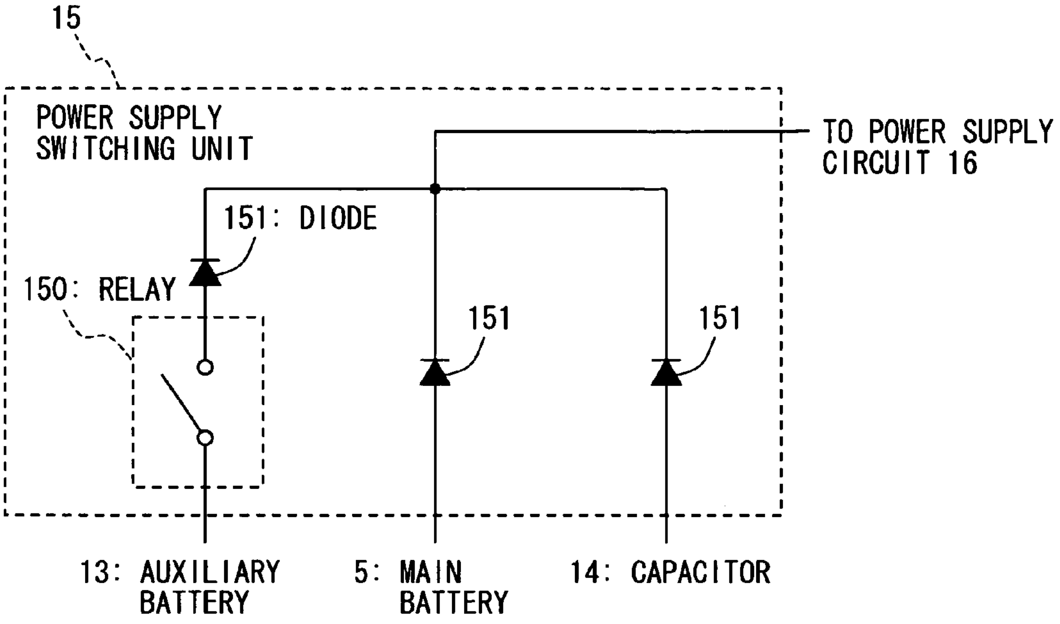
FIG. 2 is a schematic diagram of a power supply switching unit of the reporting system.

As shown in FIG. 2, the power supply switching unit 15 includes a relay 150 and diodes 151. In response to an instruction from the control unit 11, the switching unit 15 switches the relay 150 so as to enable and disable the power supply from the auxiliary battery 13.

The power supply circuit 16 adjusts and amplifies the power from the main battery 5, auxiliary battery 13, or capacitor 14, and distributes power to the signal detection unit 10, control unit 11, and emergency communication means 12.

Specifically, the auxiliary battery 13 is a battery or a cell. The auxiliary battery 13 ensures power supply in an emergency. Therefore, until the auxiliary battery 13 is replaced, voltage of the auxiliary battery 13 needs to be kept at a certain voltage or high enough to serve as an alternative power supply in an emergency. In general, the auxiliary battery of a car is replaced when the car is inspected at intervals of some years. This makes it necessary for the auxiliary battery 13 to maintain the voltage for at least some years. In general, it is difficult for a secondary cell, which can be charged, to maintain the voltage for some years. As a result, a primary cell, which cannot be charged, is used as the auxiliary battery 13.

In the circumstances, it is required to make the consumption (in particular, normal consumption) of the power of the auxiliary battery 13 as low as possible.

False transmission of an emergency report greatly confuses and adversely affects the emergency agency 4, traffic, etc. Therefore, an emergency report needs to be transmitted very carefully so that it can be reliably determined whether the vehicle is actually in an urgent situation.

Figure 3:
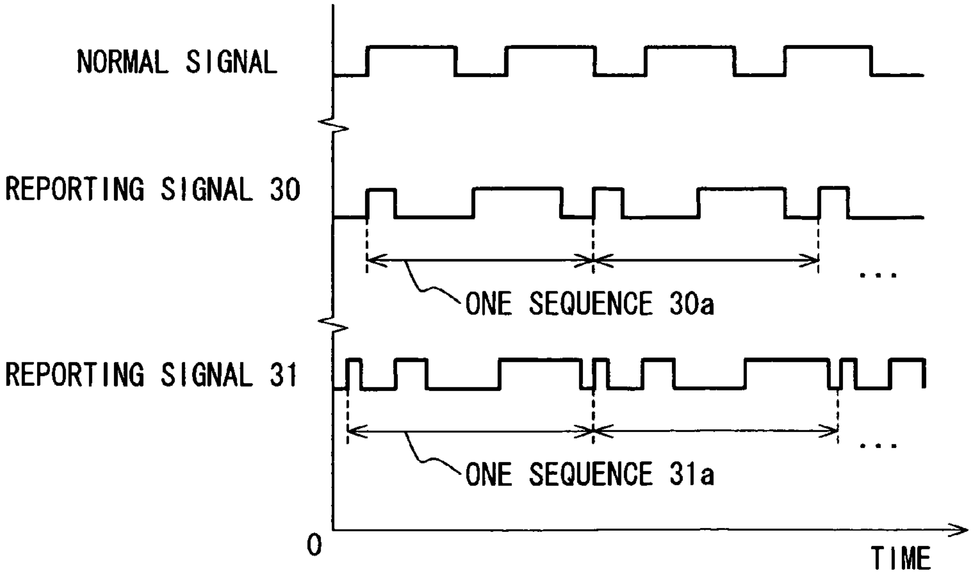
FIG. 3 is a timing diagram showing waveforms of reporting signals.

For the reliable determination, the reporting signals are made special and distinct from the normal signals. For example, FIG. 3 shows variations with time in the waveforms of reporting signals 30 and 31, which includes sequences 30*a* and 31*a* in series, respectively. Each of the sequences 30*a*, 31*a* is made of a multiple pulses that have different waveform from each other. The emergency reporting system 1 is configured to perform no emergency reporting until the emergency reporting system 1 verifies the above special reporting signal. FIG. 3 shows an example of different sequential patterns (waveforms) for different signals. Although the reporting signals 30, 31 and the normal signal are shown in a timing chart in FIG. 3, the relation between intervals of the sequences in each of the signals are not limited to the illustration in FIG. 3. In other words, the timing of the leading edges or falling edges of the signals can be arbitrary and can occur at any time provided that the reporting signals 30, 31 are distinct form the normal signal.

Figure 4:
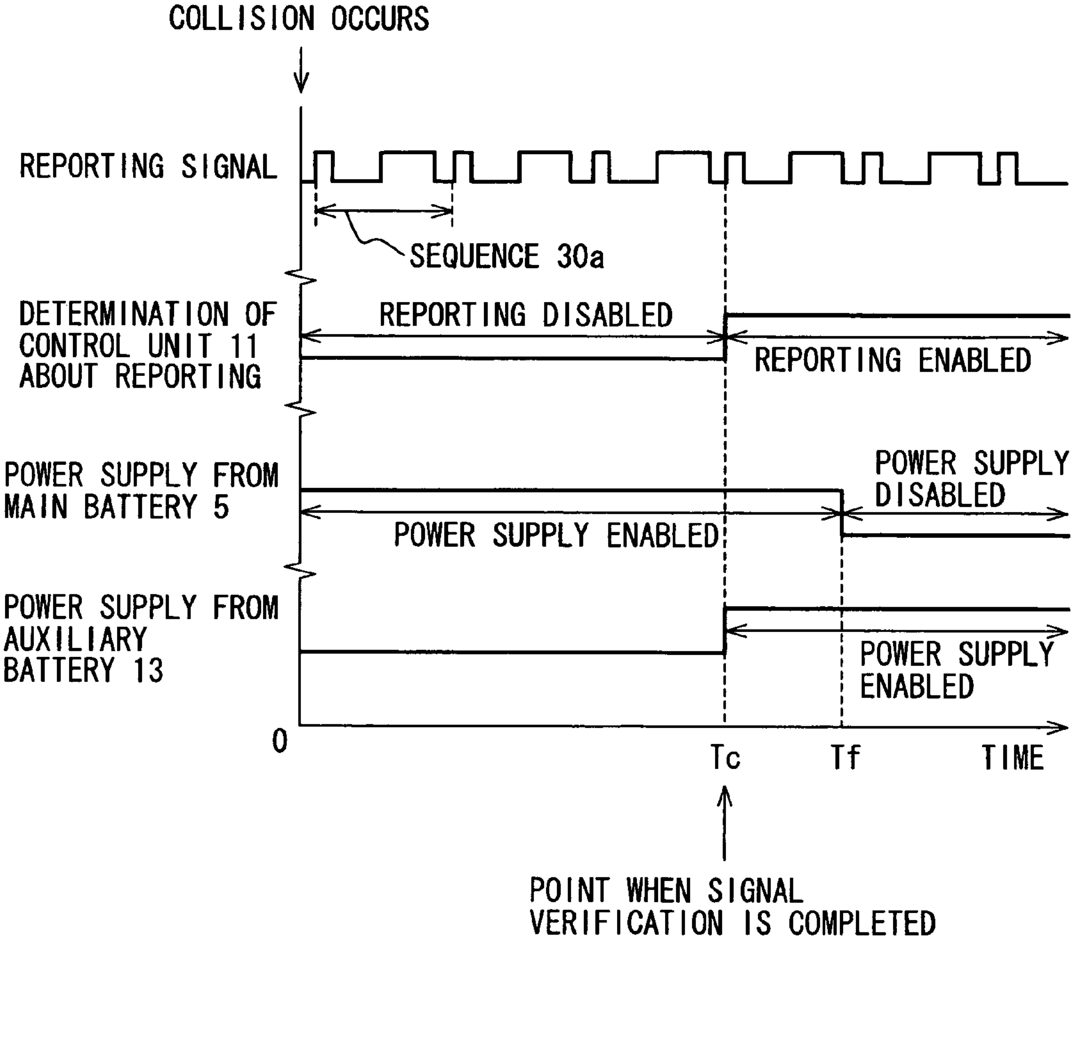
FIG. 4 is a timing diagram showing a comparative example of an operation of a general emergency reporting system.
Figure 5:
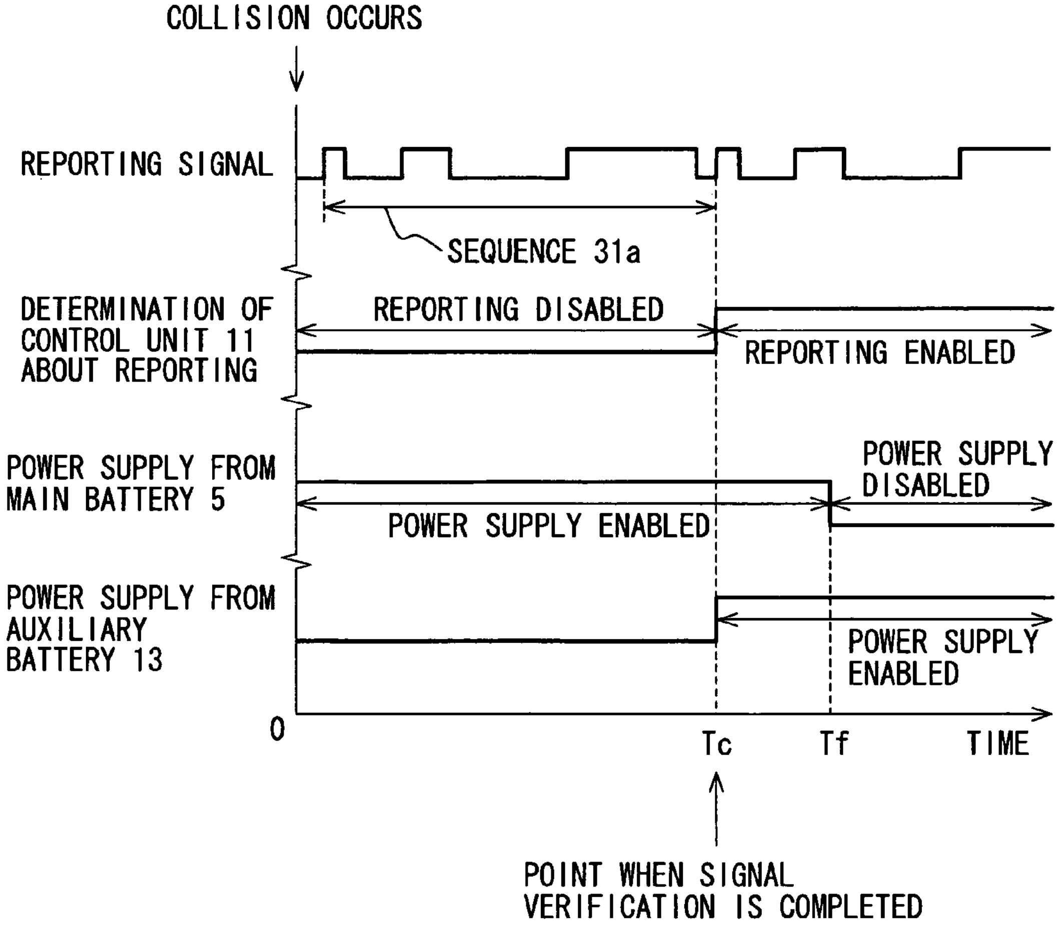
FIG. 5 is a timing diagram showing another comparative example of an operation of the general emergency reporting system.

Comparison examples of operation are shown in FIGS. 4 and 5 (timing diagrams that start when a collision occurs). In a case where a reporting signal 30 is used, as shown in FIG. 4, the control unit 11 performs no emergency reporting unless the control unit 11 verifies a specified number of pulse sequences 30*a* in series. Thus, even if the control unit 11 verifies only one of the pulse sequences 30*a*, the control unit 11 does not perform the emergency reporting.

There is a case where the pulse sequences are more complicated. For example, the sequence of the reporting signal 31 is more complicated than the sequence of the reporting signal 30. In this case, no emergency reporting is performed unless one pulse sequence is verified. Thus, even if part of the pulse sequence is verified, emergency reporting is not executed. FIG. 5 shows a comparison example of this operation in a case where the reporting signal 31 is used. In this case, the control unit 11 performs no emergency reporting until the control unit 11 has completely verified the pulse sequence 31*a* (until time Tc is reached).

By verifying the above complicated signal, it is possible to reliably determine whether the vehicle is in a condition of emergency and it is possible to reliably confirms that time Tc is reached so that the conditions for transmitting an emergency report are met.

If it is determined, as stated above, that the vehicle is in a condition of emergency, it is reliably assumed that the impact of collision may break the main battery 5, and thereby causing a voltage drop, or may break the power supply line, and thereby preventing the main battery 5 from supplying power. Specifically, with reference to FIGS. 4 and 5, the power supply from the main battery 5 may fail at time Tf. Therefore, the power supply switching unit 15 switches the power supply from the main battery 5 to the auxiliary battery 13 at time Tc, at which the verification of the reporting signal is completed, to start up the auxiliary battery 13. If it is determined that the vehicle is not in a condition of emergency, the power supply is not switched to the auxiliary battery 13.

Figure 6:
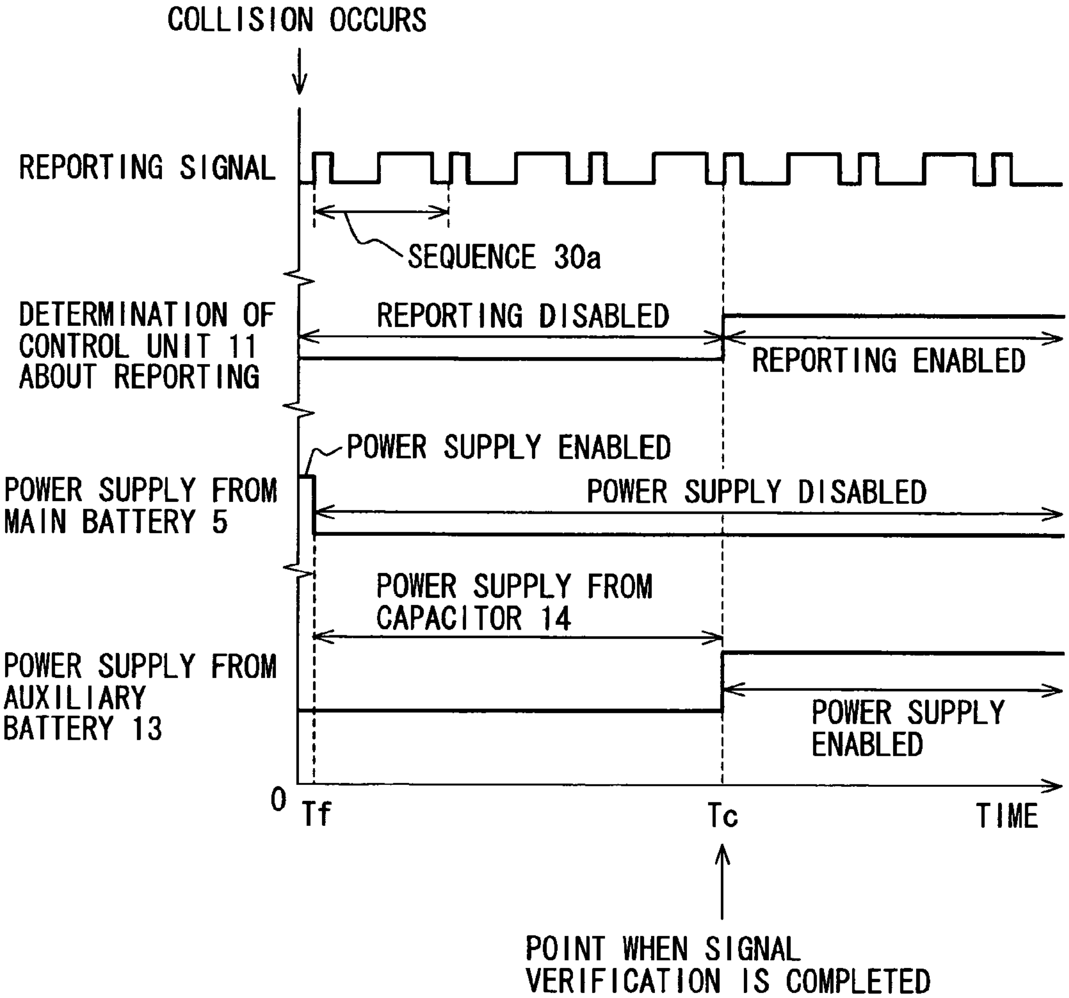
FIG. 6 is a timing diagram showing another comparative example of an operation of the general emergency reporting system.
Figure 7:
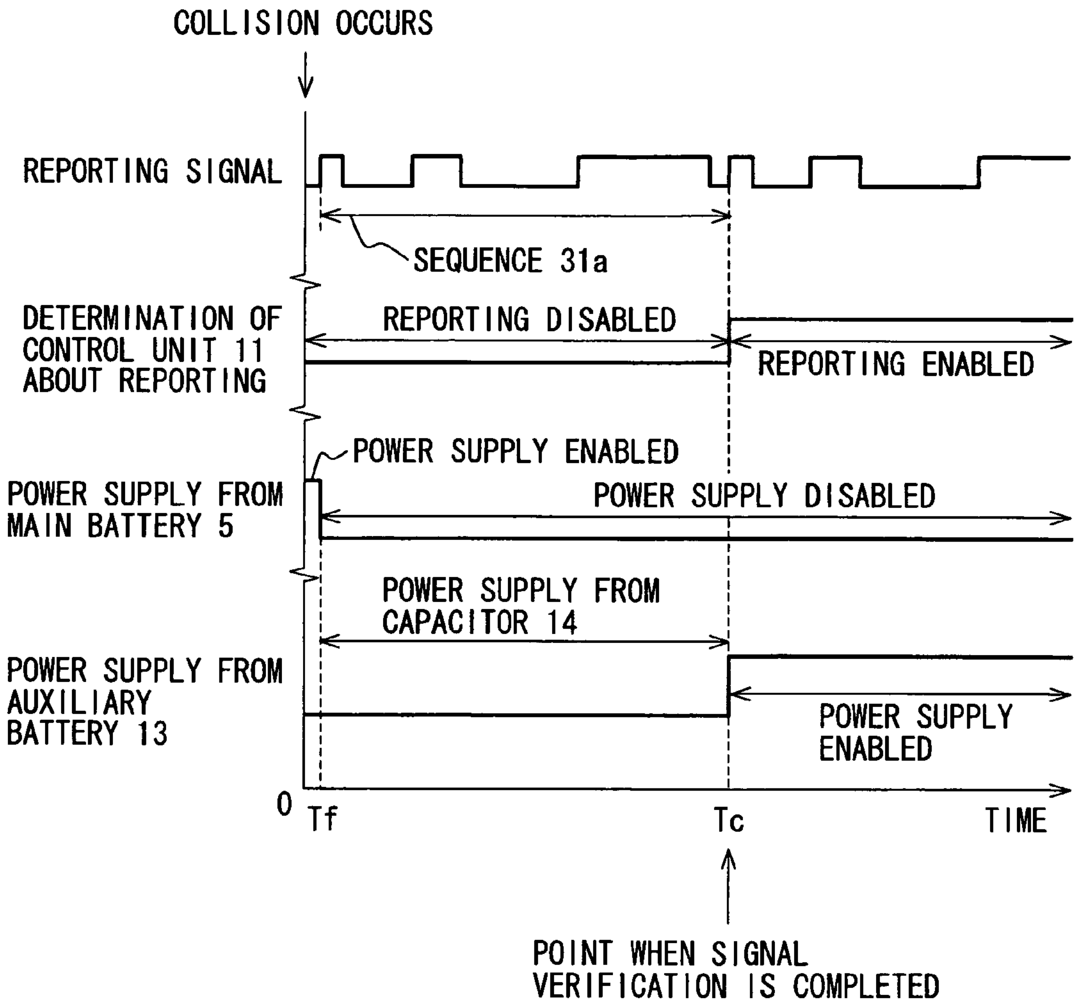
FIG. 7 is a timing diagram showing another comparative example of an operation of the general emergency reporting system.

FIGS. 6, 7 show another comparison examples of the operation. As shown in FIGS. 6 and 7, before the transmitting conditions are met or while a reporting signal is being verified, the main battery 5 may break down, and thereby causing a voltage drop so that the main battery 5 is disabled to supply power. In this case, until the power supply is switched to the auxiliary battery 13 since the break down occurs (from time Tf to time Tc), the emergency reporting system 1 operates on the electric energy stored in the capacitor 14.

As a result, power supply can be maintained even in the failure in the power supply of the main battery 5 in an emergency, and also the consumption of the power of the auxiliary battery 13 can be restrained.

From the point of view of the restraint of the consumption of the power of the auxiliary power supply and the prevention of the false transmission of an emergency report, the emergency report is transmitted or the power supply is switched to the auxiliary power supply when a complicated reporting signal has been verified. Therefore, a certain length of time (about some hundreds of milliseconds to some seconds) is required until the transmitting conditions met after the collision occurred, and thereby the power supply is switched to the auxiliary power supply. If the damage from the collision cuts off the power supply from the main power supply at an early stage, the capacitor may simultaneously serve as the power supply for a longer time, as shown in FIGS. 6 and 7. If things come to the worst, the power supply from the main power supply may fail when the collision occurs. In this case, it is necessary to rely on the capacitor for a very long time.

The inventors specified the above disadvantageous features of the comparison examples of the emergency reporting system, and the present invention is made in view of the above disadvantages. In Embodiment 1, the occurrence of a collision makes the air bag ECU output a reporting signal. A summary of this operation example is that the operating power supply, which is supplied for the operation of the emergency reporting, is switched to the auxiliary power supply in a period between (a) a point of time when the reporting signal starts to be verified and (b) another point of time when the reporting signal has been verified. In Embodiment 1, the reporting signal 30 as shown in FIG. 3 is used, and the control unit 11 completes the verification of the reporting signal by verifying a series of multiple pulse sequences 30*a* (e.g., three pulse sequences in series). This operation will be described below in detail with further reference to the control operation flowchart shown in FIG. 8.

Figure 8:
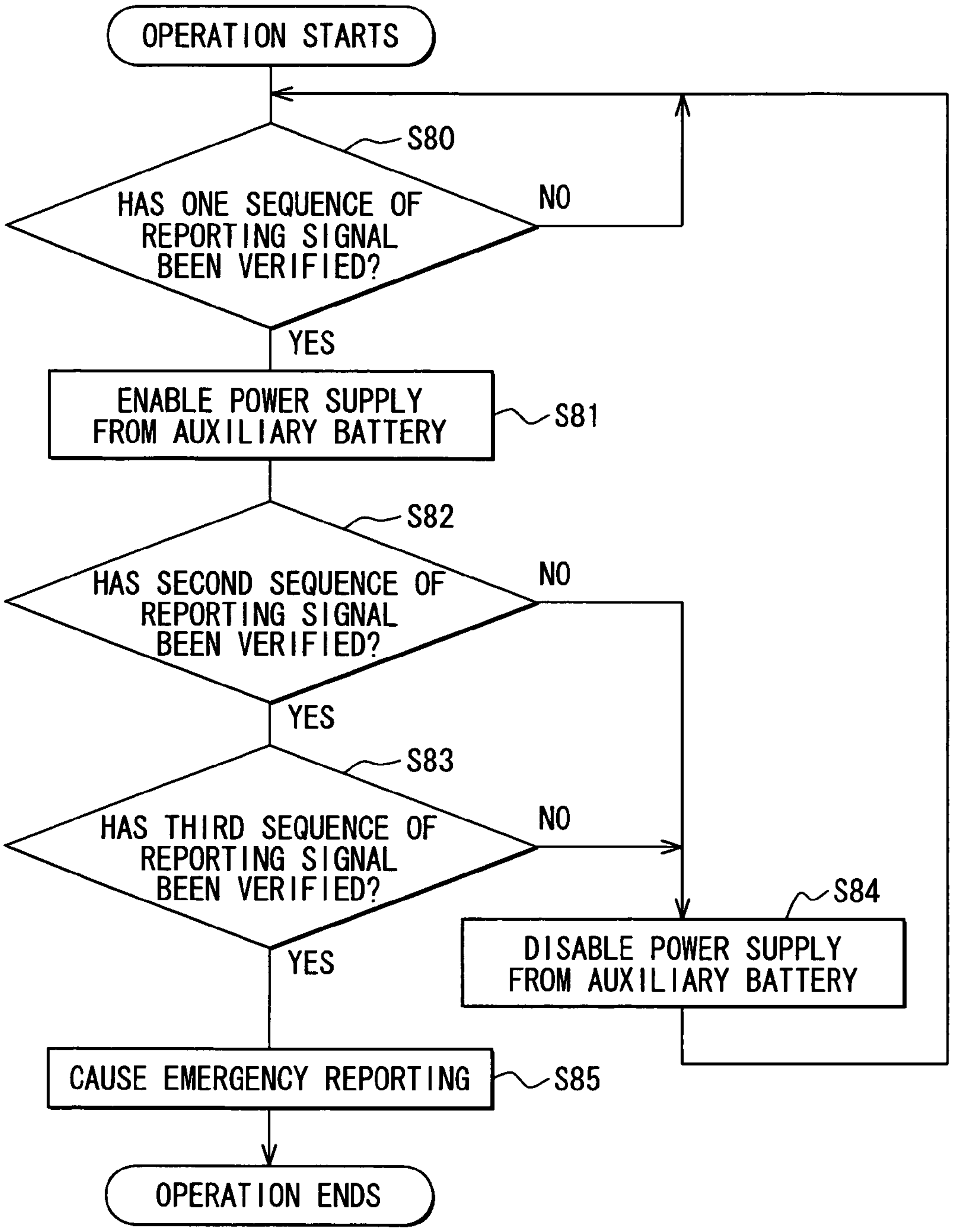
FIG. 8 is a flowchart of the operation of the emergency reporting system according to Embodiment 1.

With reference to FIG. 8, the operation starts when the user starts up the driving source of the vehicle (turns on the ignition switch). This makes the main battery 5 supply power to the emergency reporting system 1, so that the control unit 11 starts to operate. The operation ends when the user stops the driving source (turns off the ignition switch).

Control proceeds to step S80, where the control unit 11 determines whether the control unit 11 has verified part of a reporting signal (started to verify the signal). The determination may be based on the information on the high-pulse and low-pulse durations of the pulse signal inputted by or received from the signal detection unit 10. The determination may be made by the comparison between the pulse signal currently inputted into the emergency reporting system 1 and the data on the reporting signal (e.g., pulse sequences 30*a* of the reporting signal 30) stored in the ROM.

Figure 9:
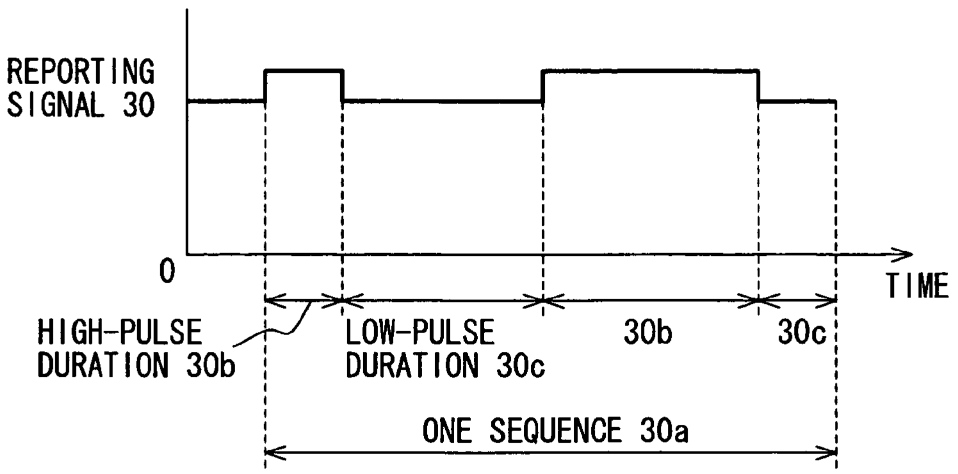
FIG. 9 is a timing diagram showing data on the wave pattern of a reporting signal for the operation of Embodiment 1.

For example, FIG. 9 shows a wave pattern of each of the pulse sequences 30*a* of the stored reporting signal 30, the pattern including the high-pulse durations 30*b* and low-pulse durations 30*c*. If the wave pattern of a pulse signal being inputted to the emergency reporting system 1 coincides with the wave pattern of one of the pulse sequences 30*a*, the control unit 11 determines that the control unit 11 has verified part of a reporting signal. The wave pattern of the pulse signal input as the reporting signal in an emergency differs from the pattern of the pulse signals inputted as normal signals in a normal condition. By continuously inputting normal signals, which differ from reporting signals, it is possible to quickly and accurately verify that the reporting signal has been input.

At step S80, if the control unit 11 verifies part of a reporting signal, that is, one of the three pulse sequences (yes at step S80), the control unit 11 unit determines that the control unit 11 has started to verify the signal. For example, in the present embodiment, three pulse sequences need to be verified for completing the verification. Then, the operation goes to step S81. Until the control unit 11 verifies the part of the reporting signal (no at step S80), the control unit 11 stands by, repeating the process of step S80.

At step S81, the control unit 11 switches the operating power supply for the emergency reporting to the auxiliary battery 13. Specifically, at this step, the control unit 11 instructs the power supply switching unit 15 to turn on the relay 150. This makes it possible to supply power for the operation of the emergency reporting system 1 also from the auxiliary battery 13. That is, the auxiliary battery 13 can also serve as the operating power supply for the emergency reporting system 1 for the operation of the emergency reporting in addition to the main battery 5.

At the next step S82, in order to prevent the false transmission of an emergency report, the control unit 11 reconfirms whether the verification at step S80 is correct. For example, it is assumed that, at step S80, the control unit 11 might, in rare cases, mistake a normal signal for a reporting signal if an unexpected disturbance disturbs or breaks the pulse signal received from the air bag ECU to the signal detection unit 10.

Specifically, at step S82, the control unit 11 determines, as the control unit 11 did at step S80, whether the control unit 11 has verified the same pulse sequence of the reporting signal as it verified at step S80 (whether it has verified two pulse sequences in series). In other words, if the vehicle is in an urgent situation, the control unit 11 determines, as it did at step S80, whether the control unit 11 has verified the second pulse sequence of the three sequences, which are to be verified in series. If the control unit 11 verifies the second pulse sequence of the reporting signal (yes at step S82), operation goes to step S83. If the control unit 11 does not verify this sequence (no at step S82), operation goes to step S84.

If the determination at step S82 results in no, it is found that the verification of the reporting signal cannot be completed, and thereby the vehicle is not in an urgent situation. In this case, there is no need to supply power from the auxiliary battery 13. If the power supply from the auxiliary battery 13 were kept available, the waste of power would not be negligible. Therefore, at step S84, the control unit 11 instructs the power supply switching unit 15 to turn off the relay 150 so as to cut off (disable) the power supply from the auxiliary battery 13. That is, because the verification of the reporting signal is not completed, the power supply is switched from the auxiliary battery 13 to the main battery 5. Then, operation returns to step S80.

At step S83, in order to make sure whether the reporting signal has been verified, the control unit 11 determines, as it did at step S82, whether the verification at steps 80 and 82 is correct. Specifically, at step S83, the control unit 11 determines substantially as stated above whether it has verified the same pulse sequence of the reporting signal as it verified at step S80 (whether it has verified three pulse sequences in series). In other words, if the vehicle is in an urgent situation, the control unit 11 determines whether it has verified the third pulse sequence of the three sequences. If the control unit 11 verifies the third pulse sequence of the reporting signal (yes at step S83), it determines that the reporting signal has been verified. Then, operation goes to step S85. If the control unit 11 does not verify the third sequence (no at step S83), operation goes to step S84.

At step S85, because it is found that the vehicle is in an urgent situation that needs emergency reporting (that the conditions for transmitting an emergency report are met), the control unit 11 instructs the emergency communication means 12 to perform emergency reporting to the outside emergency agency 4. Subsequently, the operation ends.

Figure 10:
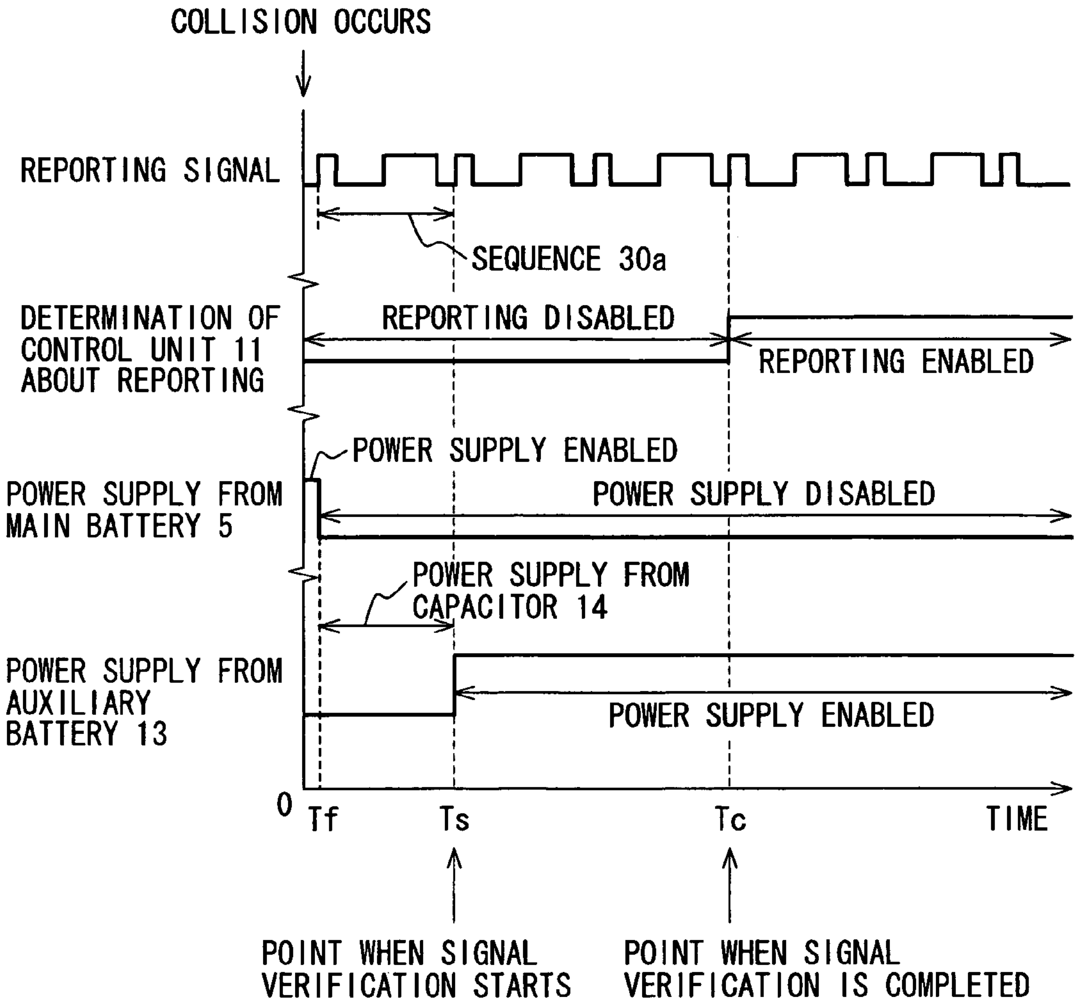
FIG. 10 is a timing diagram showing an example of the operation of the emergency reporting system of Embodiment 1.

Thus, by performing the emergency reporting only upon completion of the verification of the complicated reporting signal, it is possible to inhibit false transmission of an emergency report. If the power supply from the auxiliary battery 13 is made available in a period between (a) the point when part of the reporting signal has been verified and (b) the point when the verification of this signal is completed, a time interval, during which the capacitor 14 ensures power supply, is shortened even in a case, where a serious collision breaks disables the main battery 5 to supply power at an early stage. In particular, in this operation example, the power supply from the auxiliary battery 13 is made available when the verification of a reporting signal starts. This further shortens the time interval, during which the capacitor 14 ensures power supply. For example, as shown in FIG. 10, the power supply from the auxiliary battery 13 may be made available at time Ts (POINT WHEN SIGNAL VERIFICATION STARTS in FIG. 10) when one pulse sequence 30*a* or the first one of the pulse sequences 30*a* of the reporting signal has been verified. This more quickly enables the auxiliary battery 13 to supply power. As a result, even if the power supply from the main battery 5 fails (at time Tf) nearly at the same time that a collision occurs, it is possible to greatly shorten, as compared with a conventional case (for example, FIG. 6), the time interval (from time Tf to time Ts) during which the capacitor 14 supplies power. Even if a serious accident cuts off the power supply from the main power supply before the operating power supply is switched to the auxiliary power supply, it is possible to shorten the length of time period between (a) the point when the power supply from the main power supply stops and (b) the point when the power supply from the auxiliary power supply starts. In other words, it is possible to reduce the necessary capacitance of the capacitor 14, which forms part of the emergency reporting system 1. This makes it possible to reduce the size of the capacitor 14. As a result, the whole system can be small in size and light in weight, while the system can be prevented from falsely transmitting emergency reports.

Even in a case where the power supply from the auxiliary battery 13 is made available, the control unit 11 turns off the relay 150 so as to cut off the power supply from the battery 13 if the verification of a reporting signal is not completed. This makes it possible to restrain the waste (normal consumption) of the power from the auxiliary battery 13, which cannot be charged. The waste restraint extends the life of the auxiliary battery 13, which ensures power supply even if the power supply from the main battery 5 fails.

In other words, it is possible to make the whole of the emergency reporting system 1 small in size and light in weight, while it is possible to inhibit the system from falsely transmitting emergency reports. In addition, it is possible to set aside for a long period the auxiliary power supply, which ensures power supply in case the power supply from the main power supply fails in an emergency. As a result, the system is simple in structure and can reliably perform emergency reporting while it restrains the power consumption of the auxiliary power supply.

At step S81, as stated above, the power supply from the auxiliary battery 13 is made available (at time Ts in FIG. 10) when the first pulse sequence of the reporting signal has been verified (at POINT WHEN SIGNAL VERIFICATION STARTS in FIG. 10). Alternatively, the power supply may be made available any time after the signal starts to be verified (i.e., after time Ts: POINT WHEN SIGNAL VERIFICATION STARTS in FIG. 10) (for example, when some pulse sequences have been verified), but before the signal verification is completed (i.e., before time Tc: POINT WHEN SIGNAL VERIFICATION IS COMPLETED in FIG. 10).

The point when a reporting signal starts to be verified is a point of time when the first pulse sequence of the reporting signal has been verified. Alternatively, the point when the signal verification starts may be any time (preferably the point when some pulse sequences have been verified) before the verification is completed.

Embodiment 2

Embodiment 2 of the present invention will be described with reference to the accompanying drawings. Similar components of the emergency reporting system of the present embodiment, which are similar to the components of the emergency reporting system of Embodiment 1, will be indicated by the same numerals.

In Embodiment 1, in order to inhibit false transmission of emergency reports, the control unit 11 completes the verification of the reporting signal by verifying a series of (for example, three) pulse sequences of the signal. However, in a case, where the reporting signal includes more complicated pulse sequences, the verification of only one of them can sufficiently reduce the possibility of false transmission of the emergency report.

In Embodiment 2, the reporting signal 31 as shown in FIG. 3 is used, and the control unit 11 completes the verification of the signal by verifying only one pulse sequence 31*a*. The operation of the control unit 11 in the present embodiment will be described below in detail with further reference to the control operation flowchart shown in FIG. 11.

Figure 11:
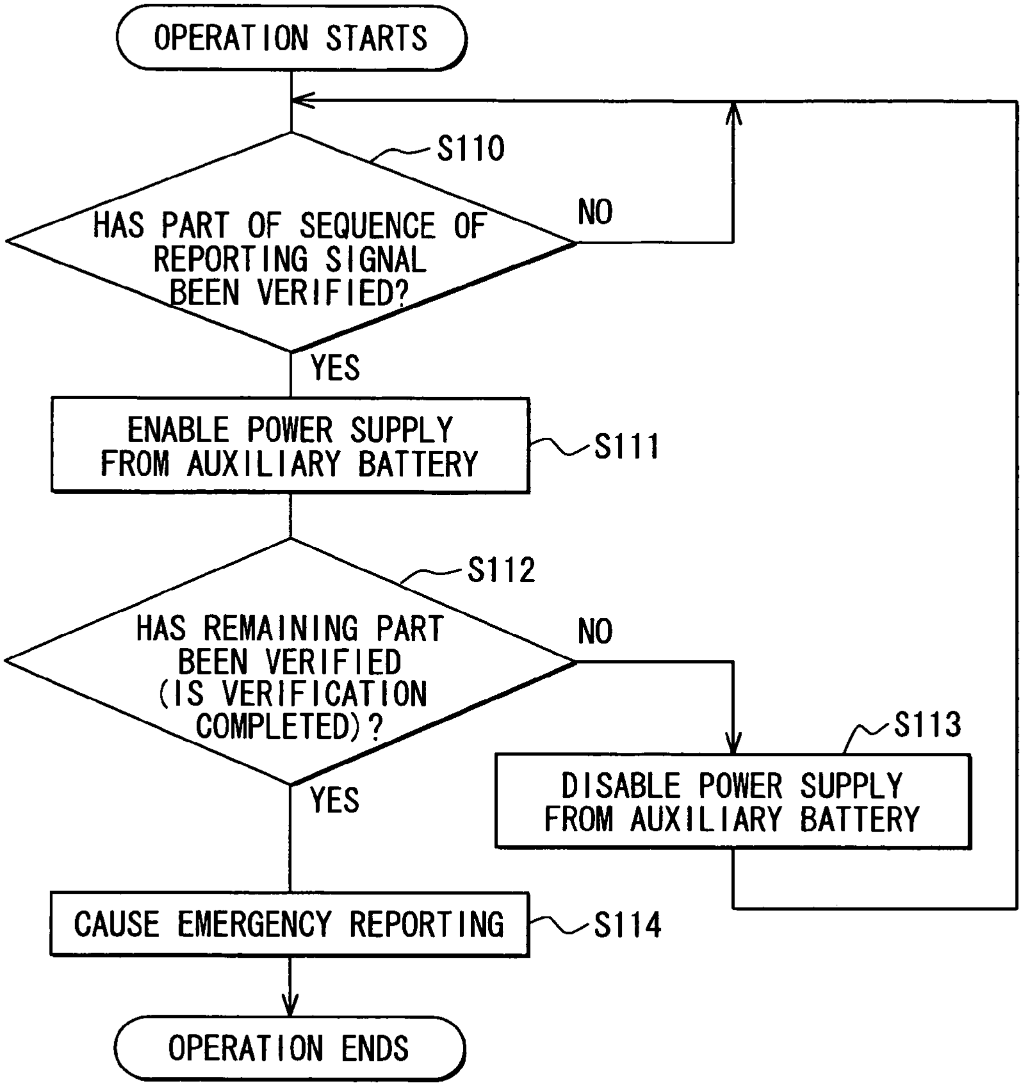
FIG. 11 is a flowchart of an operation of an emergency reporting system according to Embodiment 2 of the present invention.

Similarly to the operation shown in FIG. 8, operation shown in FIG. 11 starts and ends when the driving source of the vehicle starts up and stops respectively. After operation starts, operation goes to step S110, where the control unit 11 determines whether the control unit 11 has verified part of the reporting signal (started to verify the signal). The determination is made based on the information on the high-pulse and low-pulse durations of the pulse signal inputted by the signal detection unit 10. The determination is made by the comparison between (a) the pulse signal currently inputted into the emergency reporting system 1 and (b) part of the data on the reporting signal (pulse sequences 31*a* of the reporting signal 31) stored in the ROM.

Figure 12:
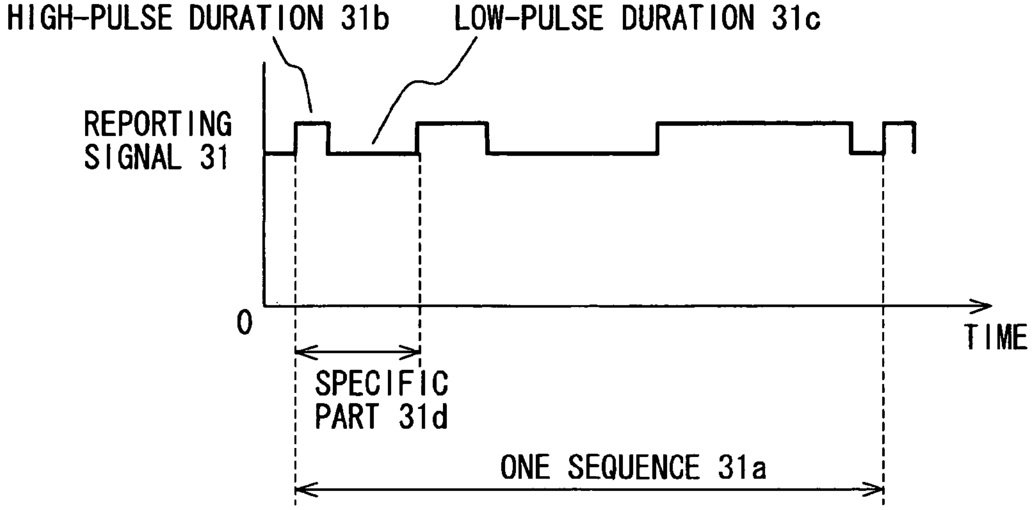
FIG. 12 is a timing diagram showing data on the wave pattern of a reporting signal for the operation of Embodiment 2.

For example, FIG. 12 shows a wave pattern that may be formed by the high-pulse and low-pulse durations of each of the pulse sequences 31*a* of the stored reporting signal. If the wave pattern of a pulse signal being input to the emergency reporting system 1 matches with the wave pattern of a specific part 31*d* of one of the pulse sequences 31*a*, the control unit 11 determines that the control unit 11 has verified part of the reporting signal (started to verify the reporting signal or verified the specific pattern of the part of the specific sequence 31*a*). The wave pattern of the specific part 31*d* includes a high-pulse duration 31*b* and a low-pulse duration 31*c* as shown in FIG. 12.

At step S110, if the control unit 11 verifies part of a reporting signal, that is, part of the specific pulse sequence that is required in the completion of verification in the present embodiment (yes at step S110), the control unit 11 determines that the control unit 11 has started to verify the reporting signal. Then, operation goes to step S111. Unless the control unit 11 verifies part of the reporting signal (no at step S110), the control unit 11 stands by.

At step S111, the control unit 11 makes it possible to supply power from the auxiliary battery 13, as is the case with step S81 (FIG. 8) in Embodiment 1.

At the next step S112, in order to make sure whether the reporting signal has been verified, the control unit 11 reconfirms whether the verification at step S110 is correct. Specifically, at this step, the control unit 11 verifies the remaining part of the pulse sequence 31*a*, which is other than the verified part 31*d*, in a way similar to that at step S110. If the control unit 11 verifies the remaining sequence part (yes at step S112), the control unit 11 determines that it has verified the reporting signal. In other words, if the control unit 11 confirms that the remaining sequence art matches with the wave pattern of a reporting signal stored in the ROM, the control unit 11 determines that the control unit 11 has completed the verification of the reporting signal. Then, operation goes to step S114, where the control unit 11 instructs the emergency communication means 12 to perform emergency reporting. If the control unit 11 does not verify the remaining sequence part (no at step S112), operation goes to step S113, where the control unit 11 makes it impossible to supply power from the auxiliary battery 13, the power supply from which was once made available.

Figure 13:
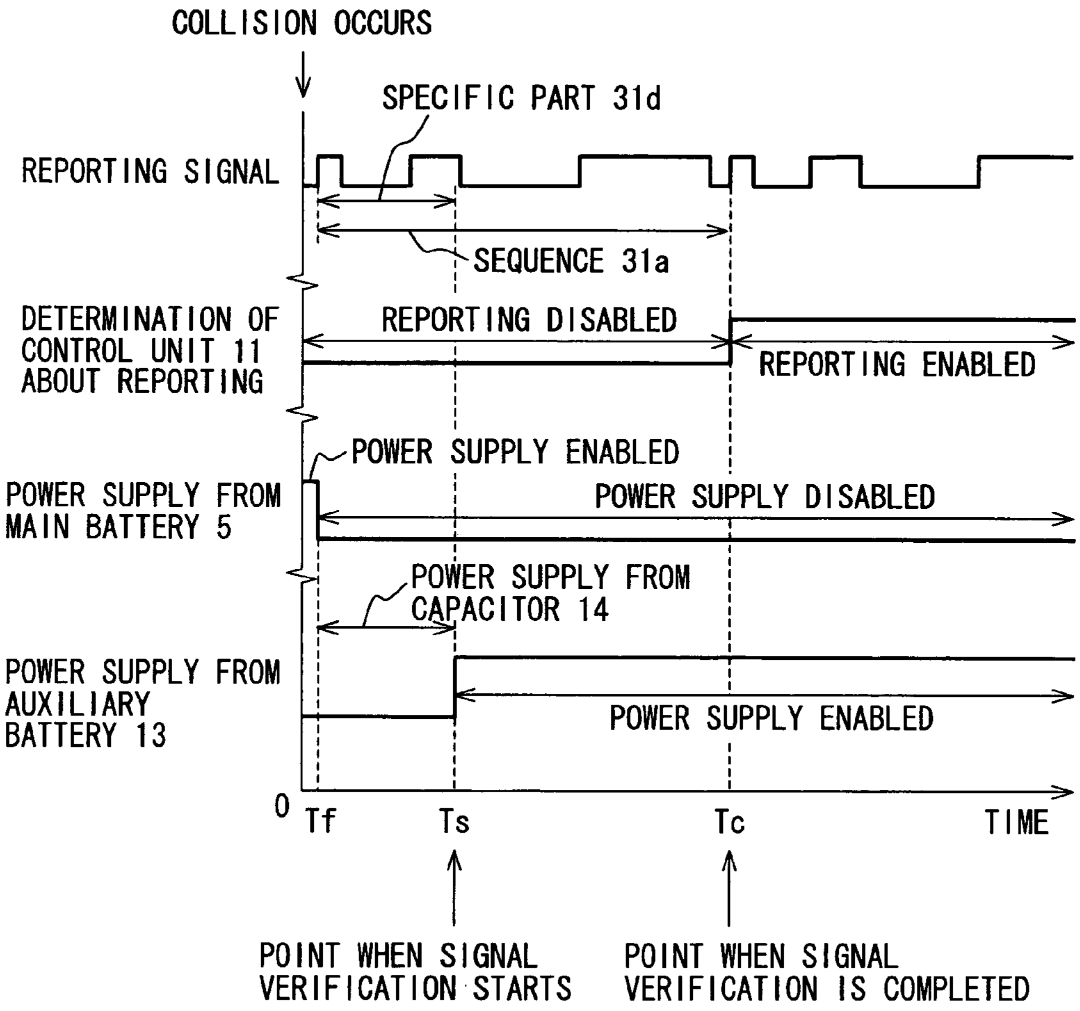
FIG. 13 is a timing diagram showing an example of the operation of the emergency reporting system of Embodiment 2.

This, as shown in FIG. 13, makes it possible to shorten the time interval, during which the capacitor 14 supplies power. This also makes it possible to restrain the waste of the power of the auxiliary battery 13. Accordingly, the present embodiment brings about effects and advantages similar to those of Embodiment 1.

At step S111, the power supply from the auxiliary battery 13 is made available at time Ts when the one pulse sequence 31*a* of the reporting signal starts to be verified (when the pulse signal corresponding to the specific part 31*d* has been verified: POINT WHEN SIGNAL VERIFICATION STARTS). Alternatively, similar to Embodiment 1, the power supply may be made available any time after the signal starts to be verified, but before the verification is completed (before time Tc: POINT WHEN SIGNAL VERIFICATION IS COMPLETED). That is, the timing for allowing the auxiliary battery 13 to supply power corresponds to any time after time Ts and before time Tc.

The point when a reporting signal starts to be verified is the point when the specific part 31*d* has been verified. The part 31*d* may be replaced by another part of the pulse sequence 31*a*, and the another part may preferably include a high-pulse duration and a low-pulse duration in series or a low-pulse duration and a high-pulse duration in series.

Embodiment 3

Embodiment 3 of the present invention will be described with reference to the accompanying drawings. Similar components of the emergency reporting system of the present embodiment, which are similar to the components of the emergency reporting system of the above Embodiments 1, 2, will be indicated by the same numerals.

In the foregoing embodiments, the power supply is switched to the auxiliary battery 13 or the auxiliary battery 13 is enabled to supply power before the verification of the reporting signal is completed, regardless of the voltage of the main battery 5. However, when the power supply is switched to the auxiliary battery 13, the main battery 5 may keep supplying power, so that the auxiliary battery 13 may be dispensable. In the present embodiment, the voltage of the main battery 5 is monitored by a voltmeter or another voltage monitoring means. After the verification of the reporting signal starts, the power supply is switched to the auxiliary power supply if the monitoring means detects that the voltage of the main battery 5 is lower than the minimum voltage necessary for the operation of the emergency reporting.

As a result, the auxiliary power supply can start up immediately when the voltage of the main power supply drops. This avoids the need for a capacitor, which would ensure a supply of operating power until the power supply is switched to the auxiliary power supply. The avoidance makes the whole system smaller in size and lighter in weight.

Other Embodiments

The present invention is not limited to the foregoing embodiments but may be embodied into various forms. In the foregoing embodiments, the control unit 11 (CPU) instructs the power supply switching unit 15 by software approach to turn on and off the relay 150 for power supply switching. Alternatively, the switching unit 15 might be so instructed by hardware approach, utilizing the electric circuitry of the signal detection unit 10.

The reporting signals may have any other patterns that distinguish them from the normal signals.

The reporting signal output unit 3 (air bag ECU) may not normally output normal signals to the signal detection unit 10, but may output only the reporting signal to the signal detection unit 10 if the collision sensor 2 responds to the collision.

Terms in the embodiments correspond to terms in the claims as follows. The reporting signal output unit 3 corresponds to the reporting signal output means. The signal detection unit 10 and control unit 11 correspond to the reporting signal verifying means. The emergency communication means 12 and control unit 11 correspond to the reporting means. The power supply switching unit 15 (relay 150 and diodes 151) and control unit 11 correspond to the power supply switching means.

Additional advantages and modifications will readily occur to those skilled in the art. The invention in its broader terms is therefore not limited to the specific details, representative apparatus, and illustrative examples shown and described.

What is claimed is:

1. An emergency reporting system for a vehicle comprising:

means for detecting pulse signals outputted from a reporting signal outputting portion, the detecting means verifying whether the detected pulse signals correspond to a reporting signal that serves as a trigger for starting emergency reporting, the reporting signal having a predetermined pattern made by combining a plurality of pulse signals, each of which has a different waveform, the detecting means being adapted to provide a signal for an operation of the emergency reporting to an outside emergency agency when the detecting means has completed the verification of the reporting signal; and means for switching a power supply for the operation of the emergency reporting from a vehicular main power supply, which supplies power for the operation of the emergency reporting, to an auxiliary power supply in a case, where the main power supply is disabled to supply power, wherein:

the switching means switches the power supply from the main power supply to the auxiliary power supply at a point when the detecting means detects a part of the predetermined pattern of the reporting signal, the part being made of at least one of the plurality of pulse signals.

2. The emergency reporting system as claimed in claim 1, wherein:

the reporting signal includes sequences in series, each of which sequences is made of the plurality of pulse signals;

the detecting means completes the verification of the reporting signal by verifying the sequences a plurality of times; and the switching means switches the power supply to the auxiliary power supply when the detecting means has verified the sequences a number of times that is smaller than the plurality of times.

3. The emergency reporting system as claimed in claim 1, wherein:

the detecting means completes the verification of the reporting signal by verifying a specific sequence of the reporting signal; and the switching means switches the power supply to the auxiliary power supply at a point when the detecting means has verified a specific pattern that is a part of the sequence.

4. The emergency reporting system as claimed in claim 1, wherein the switching means switches the power supply from the auxiliary power supply to the main power supply if the verification of the reporting signal is not completed after the switching means has switched the power supply to the auxiliary power supply.

5. The emergency reporting system as claimed in claim 1, further comprising a capacitor configured to supply power in a case, where the main power supply is disabled.

6. The emergency reporting system as claimed in claim 1, further comprising means for performing the emergency reporting to the outside emergency agency when the detecting means has completed the verification of the reporting signal.

7. An emergency reporting system for a vehicle comprising:

means for detecting pulse signals outputted from a reporting signal outputting portion, the detecting means verifying whether the detected pulse signals correspond to a reporting signal that serves as a trigger for starting emergency reporting, the reporting signal having a predetermined pattern made by combining a plurality of pulse signals, each of which has a different waveform, the detecting means being adapted to provide a signal for an operation of the emergency reporting to an outside emergency agency when the detecting means has completed the verification of the reporting signal; and switching means for switching a power supply for the operation of the emergency reporting from a vehicular main power supply, which supplies power for the operation of the emergency reporting, to an auxiliary power supply in a case, where the main power supply is disabled, wherein:

the switching means switches the power supply from the auxiliary power supply to the main power supply if the verification of the reporting signal is not completed after the switching means has switched the power supply to the auxiliary power supply.

8. The emergency reporting system as claimed in claim 7, wherein:

the reporting signal includes sequences in series, each of which sequences is made of the plurality of pulse signals;

the detecting means completes the verification of the reporting signal by verifying the sequences a plurality of times; and the switching means switches the power supply to the auxiliary power supply when the detecting means has verified the sequences a number of times that is smaller than the plurality of times.

9. The emergency reporting system as claimed in claim 7, wherein:

the detecting means completes the verification of the reporting signal by verifying a specific sequence of the reporting signal; and the switching means switches the power supply to the auxiliary power supply at a point when the detecting means has verified a specific pattern that is a part of the sequence.

10. The emergency reporting system as claimed in claim 7, further comprising a capacitor configured to supply power in a case, where the main power supply is disabled.

11. The emergency reporting system as claimed in claim 7, further comprising means for performing the emergency reporting to the outside emergency agency when the detecting means has completed the verification of the reporting signal.

12. An emergency reporting system for a vehicle comprising:

means for detecting pulse signals outputted from a reporting signal outputting portion, the detecting means inputting a reporting signal, which serves as a trigger for starting emergency reporting, based on the detected pulse signals, the reporting signal having a predetermined pattern made by combining a plurality of pulse signals, each of which has a different waveform;

means for verifying the inputted reporting signal;

means for performing an operation of the emergency reporting to an outside emergency agency when the verifying means has completed the verification of the reporting signal;

a vehicular main power supply that supplies power for the operation of the emergency reporting;

an auxiliary power supply that supplies power for the operation when the main power supply is disabled;

means for switching a power supply for the operation from the main power supply to the auxiliary power supply; and a capacitor configured to supply power for the operation until the power supply is switched to the auxiliary power supply in a case, where the main power supply is disabled, wherein:

the switching means switches the power supply from the main power supply to the auxiliary power supply at a point when the verifying means detects a part of the predetermined pattern of the reporting signal, the part being made of at least one of the plurality of pulse signals.

13. The emergency reporting system as claimed in claim 12, wherein the switching means switches the power supply from the auxiliary power supply to the main power supply if the verification of the reporting signal is not completed after the switching means has switched the power supply to the auxiliary power supply.

14. An emergency reporting system for a vehicle comprising:

means for detecting pulse signals outputted from a reporting signal outputting portion, the detecting means inputting a reporting signal, which serves as a trigger for starting emergency reporting, based on the detected pulse signals, the reporting signal having a predetermined pattern made by combining a plurality of pulse signals, each of which has a different waveform;

means for verifying the inputted reporting signal;

means for performing an operation of the emergency reporting to an outside emergency agency when the verifying means has completed the verification of the reporting signal;

a vehicular main power supply that supplies power for the operation of the emergency reporting;

an auxiliary power supply that supplies power for the operation when the main power supply is disabled;

means for switching power supply for the operation from the main power supply to the auxiliary power supply; and a capacitor configured to supply power for the operation until the power supply is switched to the auxiliary power supply in a case, where the main power supply is disabled, wherein:

the switching means switches the power supply from the auxiliary power supply to the main power supply if the verification of the reporting signal is not completed after the switching means has switched the power supply to the auxiliary power supply.

15. The emergency reporting system as claimed in claim 14, wherein the switching means switches the power supply from the auxiliary power supply to the main power supply at a time when the verifying means starts verifying the reporting signal.

* * * * *